Patented June 2, 1931

1,807,766

UNITED STATES PATENT OFFICE

CONWAY, BARON von GIRSEWALD, HANS WEIDMANN, AND GERHARD ROESNER, OF FRANKFORT-ON-THE-MAIN, GERMANY, ASSIGNORS TO AMERICAN LURGI CORPORATION, OF NEW YORK, N. Y., A CORPORATION OF NEW YORK

PROCESS FOR THE PRODUCTION OF ALKALI PHOSPHATES FROM COMPOUNDS OF METAL AND PHOSPHORUS

No Drawing. Application filed May 5, 1930, Serial No. 450,057, and in Germany May 31, 1929.

This invention relates to the production of alkali phosphates from compounds of metal and phosphorus.

It is known that alkali phosphates can be prepared by acting on ferro-phosphorus with alkali sulphates at high temperatures. This is effected by fusing a mixture of powdered ferro-phosphorus and calcined alkali sulphate in a rotary soda furnace, allowing the molten mass to cool down, after the reaction has terminated, and leaching it with water, or alternatively, by running the molten ferro-phosphorus, coming from the blast furnace, directly into the rotary furnace charged with calcined alkali sulphate, the ferro-phosphorus then mixing with the alkali sulphate and setting up the aforesaid reaction.

According to the present invention, alkali phosphate is produced from metal-phosphorus alloys, especially ferro-phosphorus, and alkali sulphate, by gradually introducing the metal-phosphorus alloy, in the form of granules or lumps, into a melt of alkali sulphate.

The superiority of the hereindescribed process over the foresaid known processes will be apparent from the following comparative considerations.

The first mentioned known process requires (1) a grinding process, (2) a mixing process, and (3) heating the material, with continuous movement, in the rotary furnace, during which operation, at a certain moment, an extremely violent exothermic reaction occurs, which cannot be checked. The process is therefore unsuitable for the practical treatment of large quantities of material, more particularly when the treatment of alloys high in phosphorus—such as ferro-phosphorus containing, for example, 24% of phosphorus—is in question. The second of the said known processes, in which the ferro-phosphorus is to be introduced in the molten state (e. g. at 1300° C.) into the rotary furnace charged with alkali sulphate, presents the drawback that it is impossible, in this manner, to obtain uniform intermixing of the reaction components. On the contrary, local caking and solidification occur. On the other hand, especially when the very hot ferro-phosphorus melt is run in quickly, the danger arises of an excessively violent and no longer controllable course of the reaction, especially in treating ferro alloys high in phosphorus.

In carrying out the hereindescribed process, the components of lower melting point (sodium sulphate, with m. p. 884° C., or potassium sulphate, with m. p. 1060° C.) are first heated to melting temperature in a suitable vessel, such as a large crucible, during which operation the moisture which is always adherent to the calcined salt, and gives rise to trouble in the known processes, is driven off. Through the gradual addition of the ferro-phosphorus, for example in granular or lump form, this material sinks slowly downwards, owing to its higher specific gravity. In this case the highly exothermic process is not a source of trouble, inasmuch as the temperature of the initial melts (884 or 1060° C.) is considerably below the reaction temperature of, for example, 1250–1300° C. It has been found that, by regulating the introduction of the ferro-phosphorus, the process can be controlled so that the conversion into alkali phosphate proceeds quietly, without the occurence of any overheating, boiling over, explosion or the like. A particular advantage of the process consists in that even very high-grade metal-phosphorus alloys—such as 24% ferro-phosphorus—can be treated smoothly and without trouble.

The process can be carried out in an extremely simple manner, for example by bringing the melt up to the reaction temperature by suitably regulating the introduction of the ferro-phosphorus, after which no further supply of heat is needed. As a rule, there is no need for stirring the charge. When a sufficient amount of ferro-phosphorus has been admitted to transpose the alkali sulphate present, a portion of the melt is drawn off for further treatment, and the remainder is treated with calcined alkali sulphate, which is thus transformed into a fused state, whereupon ferro-phosphorus is again added, and so forth.

Both sodium sulphate and potassium sulphate are suitable for employment in the process. If necessary, the sulphate melts may be given an addition of a flux, or of agents adapted to lower the melting point, such as common salt, fluorspar and the like. The metal-phosphorus alloy, such as ferro-phosphorus, is preferably treated by atomizing the melt coming from the furnace, the operation being accompanied by cooling with air or liquids, or both combined, for example, by conducting the atomizing process in presence of air and quenching the air-cooled atomized product in water or other suitable liquids. The resulting granules are admirably adapted for carrying out the present process.

*Example*

27 kgs. of potassium sulphate are fused, and 12.5 kgs. of ferro-phosphorus, containing about 24% of phosphorus, are slowly introduced into the melt, the temperature rising to about 1160° C. during this operation. The phosphorus employed is recovered in the form of water-soluble potassium phosphate, the yield being practically quantitative. Gaseous sulphur dioxide free from dust is obtained as a by-product and is particularly suitable for numerous applications, such as the production of ammonium sulphate and like products.

The treatment of the melt may consist, for example, in crushing it and leaching with water. If desired, the melt may also be allowed to run direct into water. An advantageous method is to atomize the still fluid melt and leach the resulting granules. The atomization can be effected, for example, in such a way that the resulting particles are quenched with water, or are first projected through the air, which pre-cools them, and are then quenched, or collected, in water.

The foregoing process is distinguished by extreme simplicity, low cost, ease in performance and reliability in operation. It dispenses with four separate treatments of the originating materials—which are essential in the known processes—namely, grinding the ferro-phosphorus, crushing and drying the alkali sulphate, mixing the components in a rotary furnace and agitating the charge material during the process. A special advantage of the process consists in that it is admirably adapted for smoothly treating high-grade ferro-phosphorus, and that it is independent of the place of production of metal-phosphorus alloys. Other advantages consist in that the process, when once started, can be carried on without any further supply of heat, since the heat toning can be controlled by accelerating or retarding the admission of the ferro-phosphorus, the process being therefore always under control.

We claim:—

1. A process for the production of alkali phosphates, which comprises gradually introducing a metal-phosphorus alloy in divided form into molten alkali sulphate, and extracting the resulting alkali phosphate from the transposition product in known manner.

2. A process for the production of alkali phosphates which comprises gradually introducing ferro-phosphorus in divided form into molten alkali sulphate, and extracting the resulting alkali phosphate from the transposition product in known manner.

3. A process for the production of alkali phosphates, which comprises gradually introducing a metal-phosphorus alloy in divided form into molten potassium sulphate, and extracting the resulting potassium phosphate from the transposition product in known manner.

4. A process for the production of alkali phosphates, which comprises gradually introducing a high-grade metal-phosphorus alloy in divided form into molten alkali sulphate, and extracting the resulting alkali phosphate from the transposition product in known manner.

5. A process for the production of alkali phosphates, which comprises gradually introducing ferro-phosphate, containing about 24% of P in divided form into molten alkali sulphate, and extracting the resulting alkali phosphate from the transposition product in known manner.

6. A process for the production of alkali phosphates, which comprises gradually introducing a metal-phosphorus alloy in divided form into molten alkali sulphate, and extracting the resulting alkali phosphate from the transposition product by treatment with aqueous liquids.

7. A process for the production of alkali phosphates, which comprises gradually introducing a metal-phosphorus alloy in divided form into molten alkali sulphate, bringing the still molten product into contact with an aqueous liquid, and subjecting the resulting granules to lixiviation.

8. A process for the production of alkali phosphates, which comprises gradually introducing a metal-phosphorus alloy in divided form into molten alkali sulphate, and allowing the still molten product to run into an aqueous liquid, for the purpose of lixiviation.

9. A process for the production of alkali phosphates, which comprises gradually introducing a metal-phosphorus alloy in divided form into molten alkali sulphate, atomizing the transposition product while still in a molten state, and subjecting same, in the atomized condition, to the leaching action of an aqueous liquid.

In testimony whereof, we affix our signatures.

CONWAY BARON von GIRSEWALD.
HANS WEIDMANN.
GERHARD ROESNER.